（12) United States Patent
Williams, Jr.

(10) Patent No.: US 7,614,636 B1
(45) Date of Patent: Nov. 10, 2009

(54) LOCK ASSEMBLY FOR THE TONGUE OF A STEERABLE TRAILER

(75) Inventor: Thomas M. Williams, Jr., Durham, NC (US)

(73) Assignee: Williams Innovations, LLC, Durham, NC (US)

( * ) Notice: Subject to any disclaimer, the term of this patent is extended or adjusted under 35 U.S.C. 154(b) by 296 days.

(21) Appl. No.: 11/834,931

(22) Filed: Aug. 7, 2007

(51) Int. Cl.
*B62D 13/00* (2006.01)

(52) U.S. Cl. .................. 280/445; 280/442; 280/443; 280/444

(58) Field of Classification Search .............. 280/445, 280/444, 443, 442
See application file for complete search history.

(56) References Cited

U.S. PATENT DOCUMENTS

| 4,171,825 | A | * | 10/1979 | Woodell | 280/443 |
| 4,345,775 | A | * | 8/1982 | Merrifield | 280/443 |
| 5,364,116 | A | * | 11/1994 | Houle et al. | 280/442 |
| 6,152,475 | A | * | 11/2000 | Poole | 280/426 |
| 2005/0046146 | A1 | * | 3/2005 | Plante | 280/460.1 |

* cited by examiner

*Primary Examiner*—Lesley D Morris
*Assistant Examiner*—Michael R Stabley
(74) *Attorney, Agent, or Firm*—Myers Bigel Sibley & Sajovec, P.A.

(57) ABSTRACT

A lock assembly for selectively latching the pivoting tongue of a steerable trailed vehicle includes an actuator assembly on the vehicle connected by a cable to latch bolt for spring biasing in discrete positions into aligned apertures for enabling and preventing tongue pivoting.

10 Claims, 7 Drawing Sheets

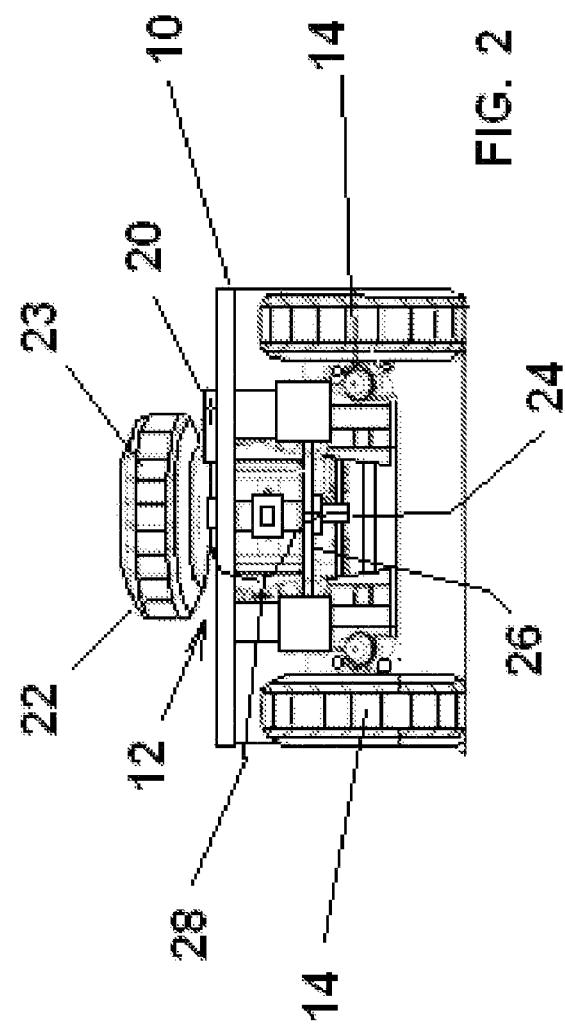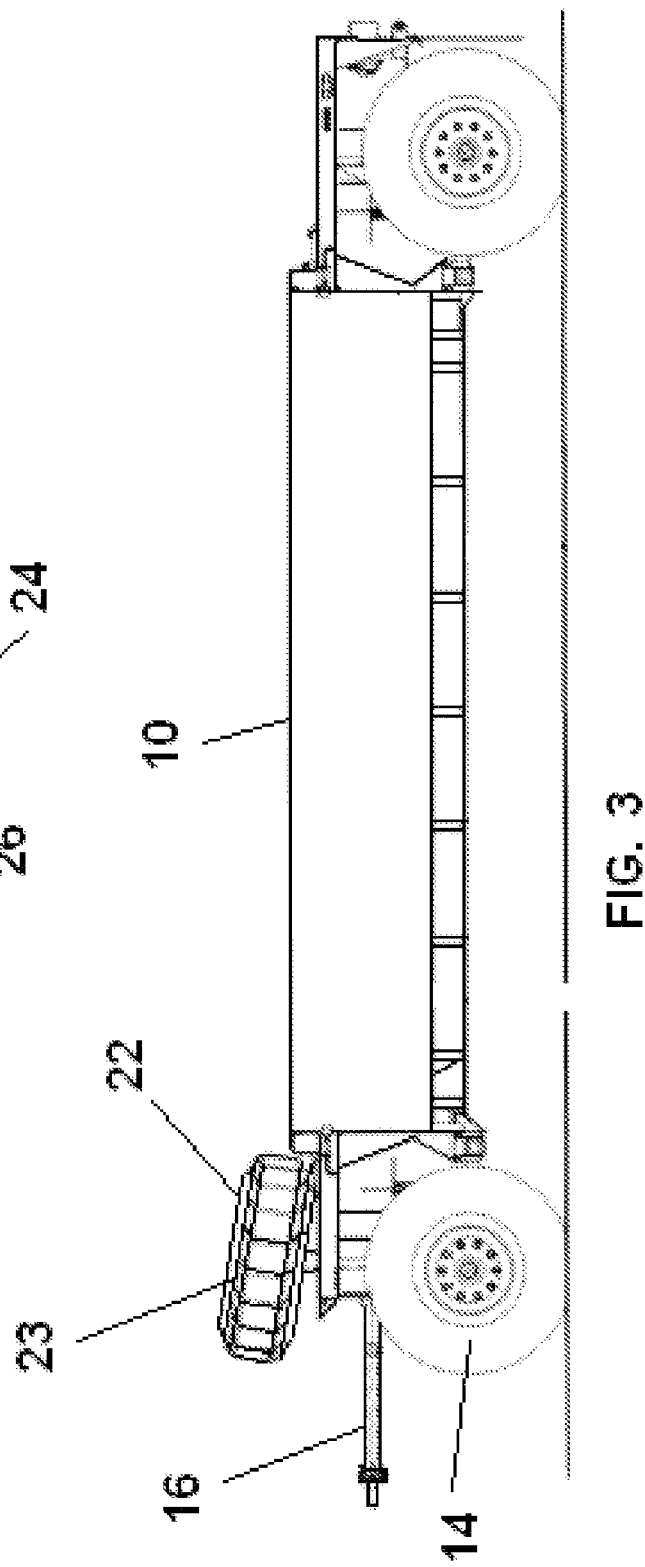

LOCK ASSEMBLY FOR THE TONGUE OF A STEERABLE TRAILER

FIELD OF THE INVENTION

The present invention relates to trailed vehicles and, in particular, a lock assembly for locking the tongue of a steerable trailer.

BACKGROUND OF THE INVENTION

Trailers having a steerable front wheel assemble responsive to pivoting of the trailer tongue relative to the towing vehicle are available for elongated transport lengths, particularly where the towing vehicle is a load transport vehicle connected to an auxiliary trailer. The steering capability allows the vehicle combination to better navigate off-road tortuous paths. While providing increased maneuverability in forward travel, due to the dual pivot at the connecting hitch and the front wheels, accurately backing up the trailer is extremely difficult.

Such combinations are common in military applications. One such application includes the military M989A1 heavy expanded mobility ammunition trailer used by the military for the transport of missile pods and munitions, palletized and unpalletized loads, fuel pods and bladders, and the like. The trailer is hauled by substantial prime mover vehicles including the HEMTT series truck and the Armored Vehicle-Mounted Rocket Launcher. During operations it is oftentimes necessary to accurately position the trailer. To overcome the inherent limitations of the dual pivots, the M989A1 trailer is provided with a manually operated lock bolt located beneath the trailer front wheel assembly, which requires an operator to crawl under the vehicle and insert a lock bolt into and out of holes that are aligned when the trailer tongue is in the longitudinal straight ahead position. Achieving such alignment requires truck movement posing a danger to the bolt operator. Even slight misalignment can create a hole location mismatch preventing insertion or removal.

It would accordingly be desirable to provide a locking mechanism for locking and unlocking a steerable wheel trailer tongue that can be readily installed on existing vehicles for selective automatic operation without risk to the operator.

SUMMARY OF THE INVENTION

This present invention provides a lock assembly for selectively latching the pivoting tongue of a steerable trailed vehicle. The lock assembly includes an actuator assembly on the vehicle accessible by an operator from the side of the vehicle and connected by a cable to latch bolt for spring biasing in discrete positions into aligned apertures for enabling and preventing tongue pivoting. More particularly, the trailed vehicle includes a frontally projecting arm having a first axial hole that axially registers with a second axial hole in the trailer chassis when the tongue is in a straight ahead position. A latch assembly supported on the arm includes a slidable latch bolt moveable between an unlatched position in the first hole allowing the pivotal movement of the tongue and a latched position in both holes preventing the pivotal movement of the tongue. An actuator assembly mounted at the front and safely accessible from the side of the trailer includes a shift member moveable between a first position and a second position. A cable operatively interconnects the latch bolt and the shift member for moving the latch bolt to the unlatched position when the shift member is in the first position and for moving the latch bolt to the latched position when the shift member is in the second position. A first spring engages the shift member and is effective under biasing to move the shift member to the first position. A second spring engaging said shift member is effective under biasing to move the shift member to the second position. A manually operated actuator handle selectively biases the springs. The actuator member in a retraction position biases the first spring whereby the shift member and cable move the bolt from the unlatched position to the latched position when the holes are aligned. The actuator member in an extension position biases the second spring whereby the shift member and cable move the bolt from the latched position to the unlatched position when the holes are aligned. Necessary movement of the truck movement is thus without risk to the operator.

In another aspect, the lock assembly includes a first lock for selectively maintaining the actuator member in the retraction position and a second lock for selectively maintaining the actuator member in the extension position.

In another aspect, the lock assembly the actuator comprises a housing and the shift member includes a shaft axially supported by the housing. The shaft includes first and second enlarged axially spaced stop surfaces, and the first spring engages and biases the first stop surface and the second spring engages and biases the second stop surface. The first stop surface engages one end of the housing in the unlatched position and the second stop surface engages another end of said housing in said latched position. An axial slot is formed in the housing and a sleeve slidably supported on the shaft. A handle extends through the slot and is connected with said sleeve. The handle is axially shifted to one axial end of the slot to establish the biasing on the first spring and axially shifted to another axial end of the slot to establish the biasing on the second spring. As a result, the latching conditions are achieved automatically without operator intervention.

Accordingly, it is an object of the invention to provide a tongue lock assembly for a steerable trailer that may be readily installed and actuated automatically without risk to the operator.

Another object is to provide a steerable trailer tongue lock that that may be conditioned for automatic actuation when the trailer tongue is properly aligned.

A further object is to provide a lock assembly for a steerable trailer that actuates under selective spring biasing to move between latched and unlatched positions without operator assistance.

BRIEF DESCRIPTION OF THE DRAWINGS

The above and other advantages of the present invention will become apparent upon reading the following written description taken in conjunction with the accompanying drawings in which:

FIG. 2 is a front view of the trailer of FIG. 1;

FIG. 3 is a side view of the trailer of FIG. 1;

DETAILED DESCRIPTION OF THE PREFERRED EMBODIMENT

Figure 1:
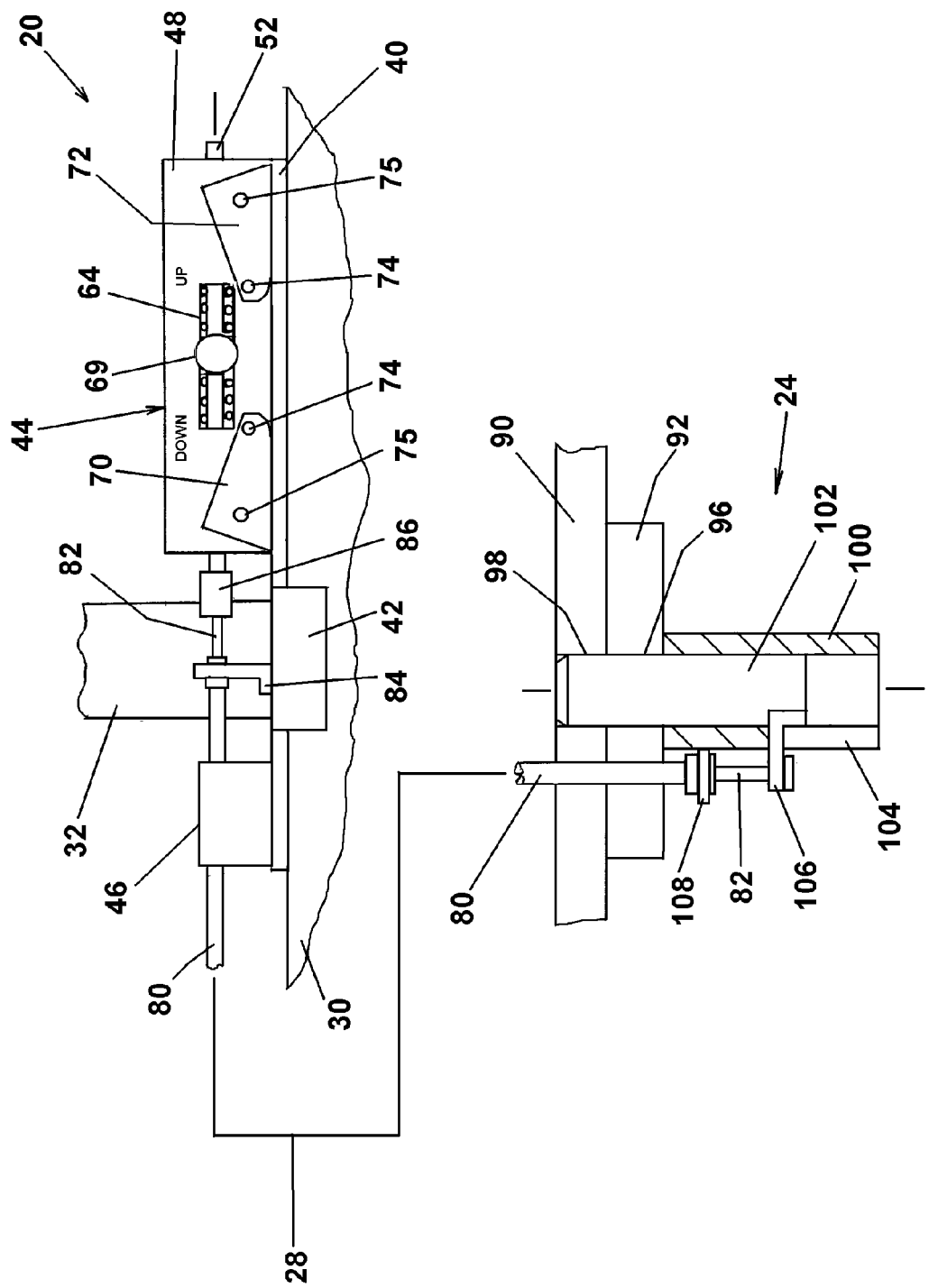
FIG. 1 a fragmentary front view of a steerable trailer provided with a tongue lock assembly.

Referring to FIGS. 2 and 3, there is shown a steerable trailer 10 provided with a tongue lock assembly 12 in accordance with a preferred embodiment of the invention. A preferred trailer is a M989A1 heavy expanded mobility ammunition trailer used by the military for the transport of missile pods and munitions, palletized and unpalletized loads, fuel pods and bladders, and the like. The trailer 10 includes a pair of front wheel assemblies 14 supported on the trailer chassis that are pivoted by a conventional steering linkage, not shown, is response to pivotal movement of a trailer tongue 16 imparted by movement of a towing vehicle. To enable controlled rearward movement of the trailer and altered towing characteristics, the lock assembly 12 is selectively used to lock the tongue in a forward straight ahead position or to unlock the tongue for steering pivotal movement. Referring additionally to FIG. 1, the lock assembly 12 comprises a control assembly 20 carried at the front of the trailer beneath a spare tire mount assembly 22 including spare tire 23, and a latch bolt assembly 24 carried beneath the tongue support assembly 26 and interconnected by a control cable assembly 28. The actuator assembly 20 is safely accessible by standing operating personnel from the side of the trailer.

Figure 4:
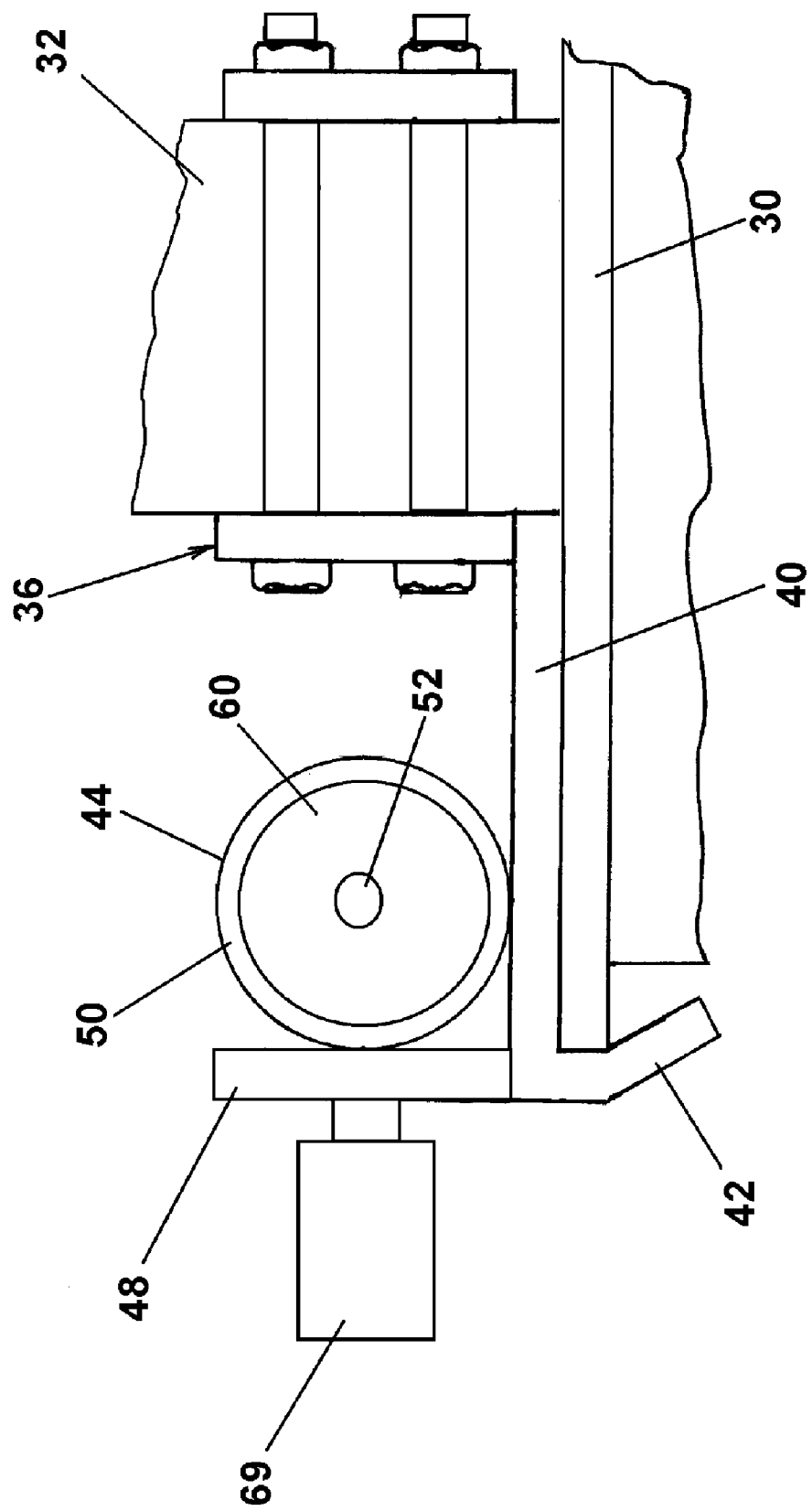
FIG. 4 is a side view of the lock assembly for FIG. 1.

More particularly and as shown in FIGS. 1 and 4, the control assembly 20 is carried on a top base or platform 30 of the spare tire mount assembly 22. The control assembly 20 is releasably connected to a support post 32 of the mount assembly 22 by a clamp assembly 36. The control assembly 20 includes a base plate 40 engaging the top surface of the platform 30. The base plate 40 has a downwardly and inwardly projecting front flange 42 that compressively engages the front edge of the platform 30 upon adjustment of the clamp assembly 36. A lock bolt actuator assembly 44 and a cylindrical cable guide sleeve 46 for routing the cable assembly 28 are attached to the base plate 40. A rectangular front face plate 48 is connected to the base plate 40 and actuator assembly 44 at front thereof.

Figure 11:
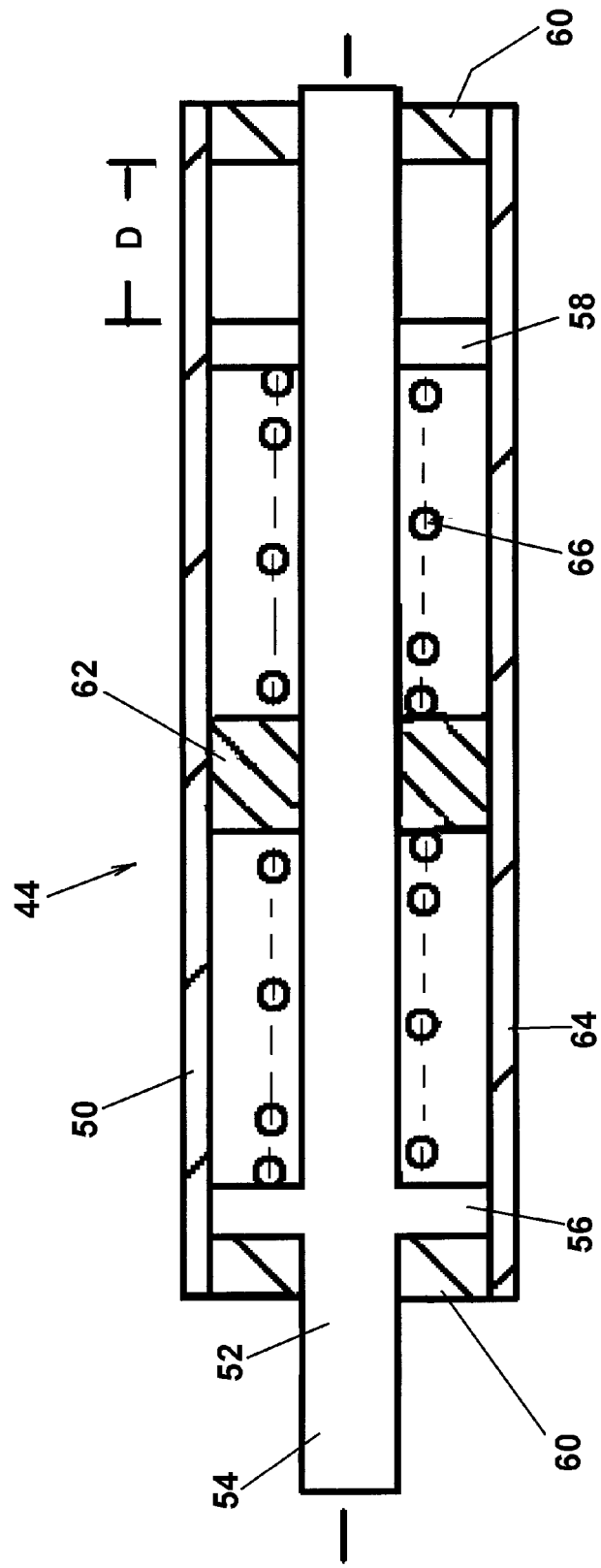
FIG. 11 is a cross sectional view of the actuator assembly.

Referring to FIG. 11, the actuator assembly 44 comprises an outer cylinder 50 axially slidably housing an actuator spindle 52. The spindle 52 includes a cylindrical shaft 54 having axially spaced enlarged cylindrical stop collars 56, 58. The outer ends of the shaft 54 extend through apertures in circular end plates 60 connected at the outer ends of the cylinder 50. The spacing between the outer surfaces of the stop collars 56, 58 is less than the spacing between the inner surfaces of end plates 60 such that the spindle 52 can reciprocate an axial distance "D" equal to the bolt travel of the lock bolt assembly as described below. An apertured cylindrical stop sleeve 62 is slidably carried on the shaft 54 intermediate the stop collars 56, 58. Helically coiled compression springs 64, 66 surround the shaft 54 between the stop collars 56, 58 and the stop sleeve 62. One of the stop collars is separately assembled to facilitate assembly. Referring additionally to FIG. 1, the cylinder 50 and the face plate 48 include frontally opening rectangular slots 64. A radially extending actuator handle 69 is attached to the stop sleeve 62, whereby the stop sleeve 62 may be shifted within the ends of the slots 64 from the neutral position of FIG. 1 to the bolt retraction position of FIG. 4 or the bolt insertion position of FIG. 5. In the neutral position, no active biasing is presented to the spindle and the same remains in the selected position.

Figure 5:
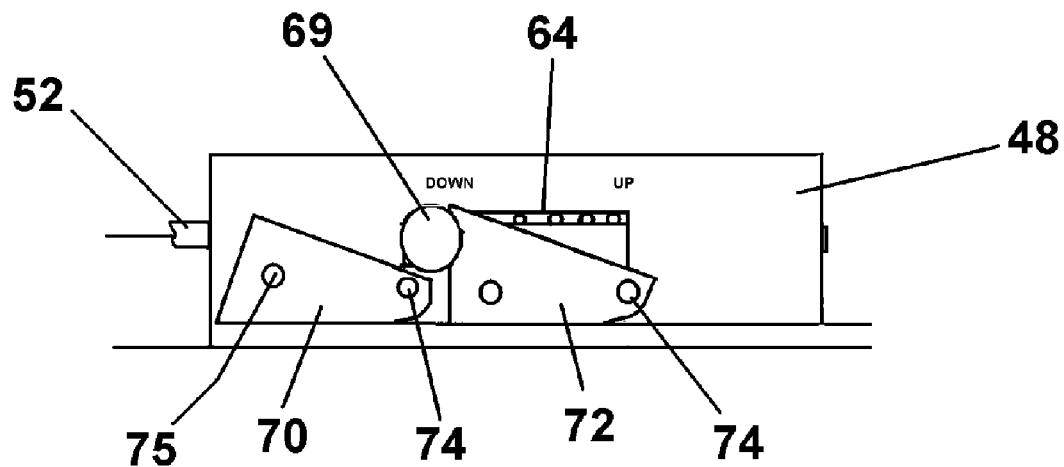
FIG. 5 is a front view of the actuator assembly for the lock assembly in the bolt retraction position.
Figure 6:
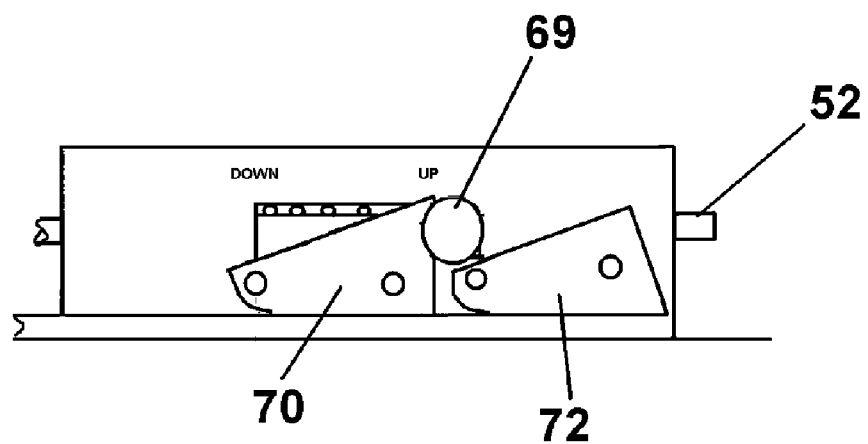
FIG. 6 is a front view of the actuator assembly for the lock assembly in the bolt insertion position.

Referring to FIGS. 5 and 6, an axially spaced pair of generally triangular stop plates 70, 72 are pivotally attached to the face plate 48 by fasteners 74. The plate include projecting pins 75 for manual rotation to the stop positions. The stop plate 72 is rotated to the stop position shown in FIG. 5 to maintain the actuator handle 69 in the left hand stop position for the bolt retraction as described below. Alternatively, the stop plate 70 is rotated to the stop position shown in FIG. 6 to maintain the actuator handle 69 in the right hand position for bolt insertion. "Up" and "Down" indicia, are provided on the face plate to denote the insertion and retraction positions respectively.

Referring to FIG. 1, the control cable assembly 28 is a conventional construction having an outer sheath 80 slidably supporting a control cable 82. At the actuator assembly, one end of the sheath is connected to a bracket 84 attached to the base plate and the associated end of the cable is connected by the projecting end of the spindle shaft 54 by coupling 86. The control cable assembly is inserted through the cylindrical opening in the guide 48 for routing the cable assembly 28 to the latch assembly 24.

The trailer tongue 16 is pivotally supported at a lower end on a transverse front chassis member including a frontal projecting plate or nose 90. A frontally projecting arm 92 is operatively connected for concurrent rotation with the trailer tongue. Vertical indicia may be provided on the front surfaces of the arm 92 and note 90 to indicate when the tongue is in the straight ahead position. Holes 96, 98 are formed in the arm 92 and nose 90, respectively that are axially aligned in the straight ahead position.

The latch assembly 24 comprises a cylindrical housing 100 attached to the lower surface of the arm 92 and slidably supporting a cylindrical latch pin or bolt 102 axially aligned with the hole 96. In the down or bolt retraction position, the upper end of the bolt 102 is resident in the hole 96 in the arm 92 and the tongue 16 and arm 92 can pivot relative to the trailer during movement. In the up or bolt insertion position, the upper end of the bolt 102 is also resident in the hole 98 in the nose 90 and the trailer tongue and arm are latched against pivotal movement relative to the trailer.

A downwardly opening slot 104 is formed in the housing 100. An actuator arm 106 extends through the slot and has an inner end connected to the bolt 102. The outer end of the control cable 82 is connected to the actuator arm 106. The outer end of the sheath 80 of the cable assembly 28 is supported by a horizontal bracket 108 attached to the housing 100. Accordingly, the bolt 102 is shifted by the cable 82 between the positions in response to actuator movement.

Figure 7:
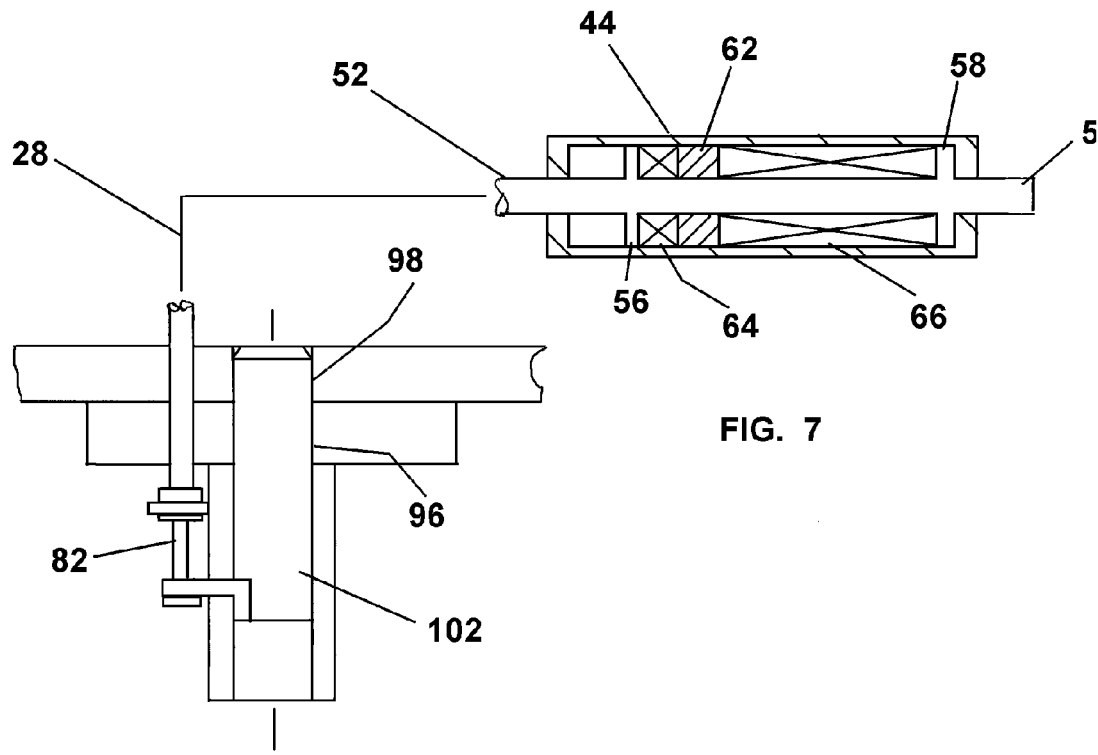
FIG. 7 is a schematic view of the lock assembly in the preparatory bolt retraction position.
Figure 8:
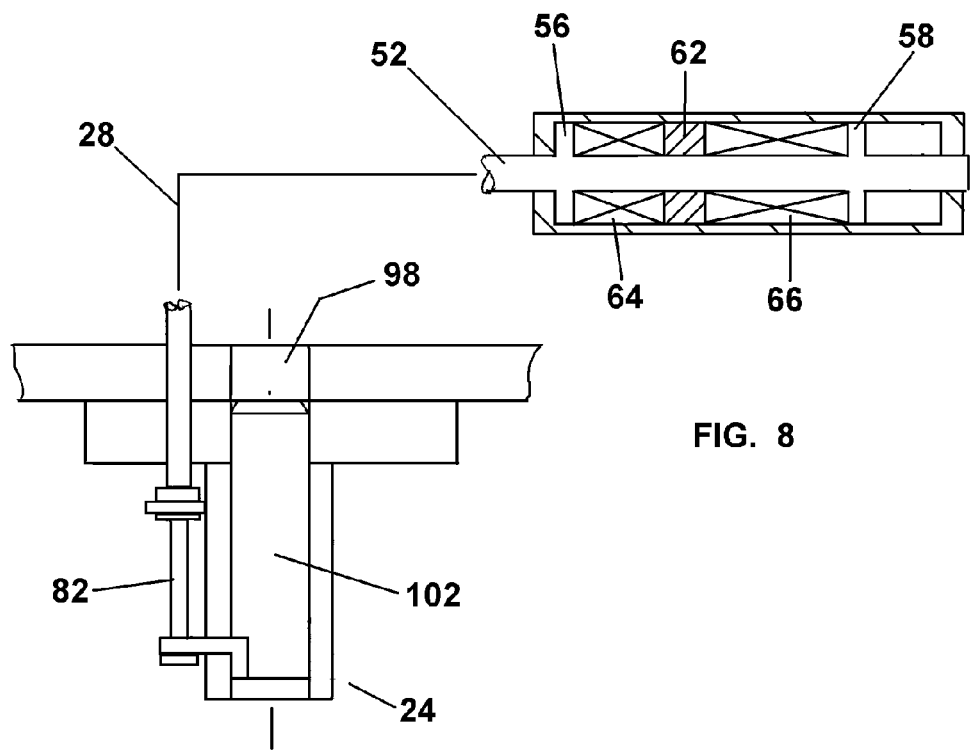
FIG. 8 is a schematic view of the lock assembly in the full bolt retraction position.

In operation, FIGS. 7 and 8 illustrate movement to unlock the tongue from the preparatory unlatched condition (FIG. 7) to the completed or full unlatched condition (FIG. 8). To establish the preparatory unlatched condition, the actuator handle 69 is shifted to the left whereby the spring 64 is compressed to establish an extending bias on the stop collar 56 and the control cable. At this position, preferably the stop plate 72 is rotated to the position shown in FIG. 5 thereby maintaining the handle position. Even with apparent alignment of the vertical indicia, there are generally sufficient shear forces on the lock bolt to resist retraction. To overcome any resistance, the towing vehicle is forwardly or rearwardly moved, readily resulting in momentary alignment allowing the bolt 102 to shift to the FIG. 7, the completed unlatched condition. The stop plate 72 may remain in the lock position to prevent any tendency for the bolt to shift during transit toward the latched condition.

Figure 9:
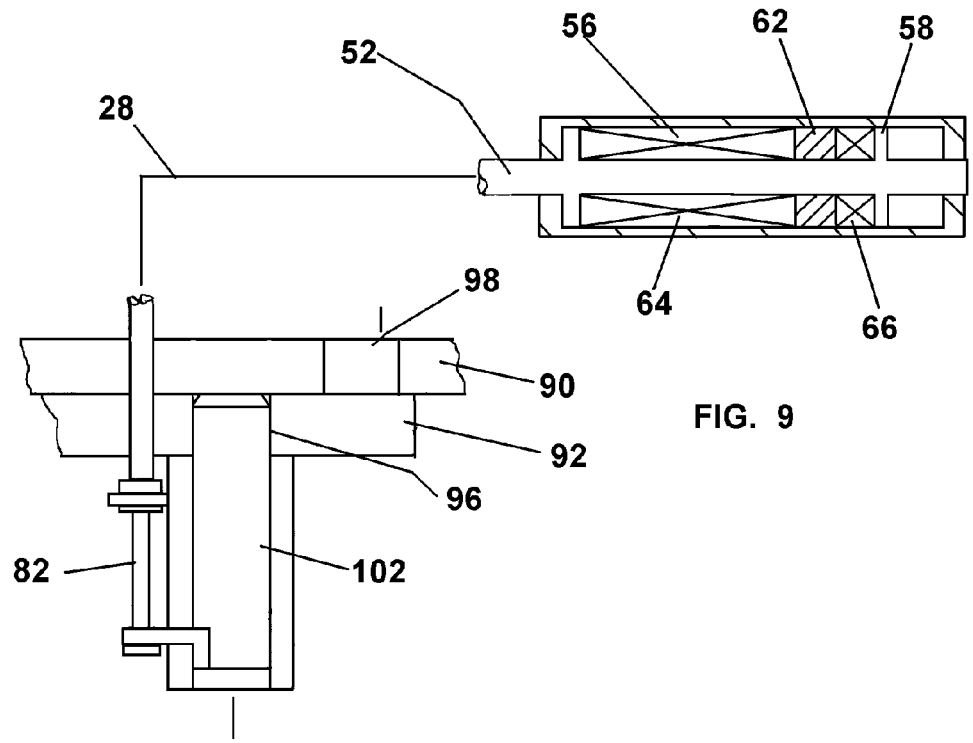
FIG. 9 is a schematic view of the lock assembly in the preparatory bolt insertion position.
Figure 10:
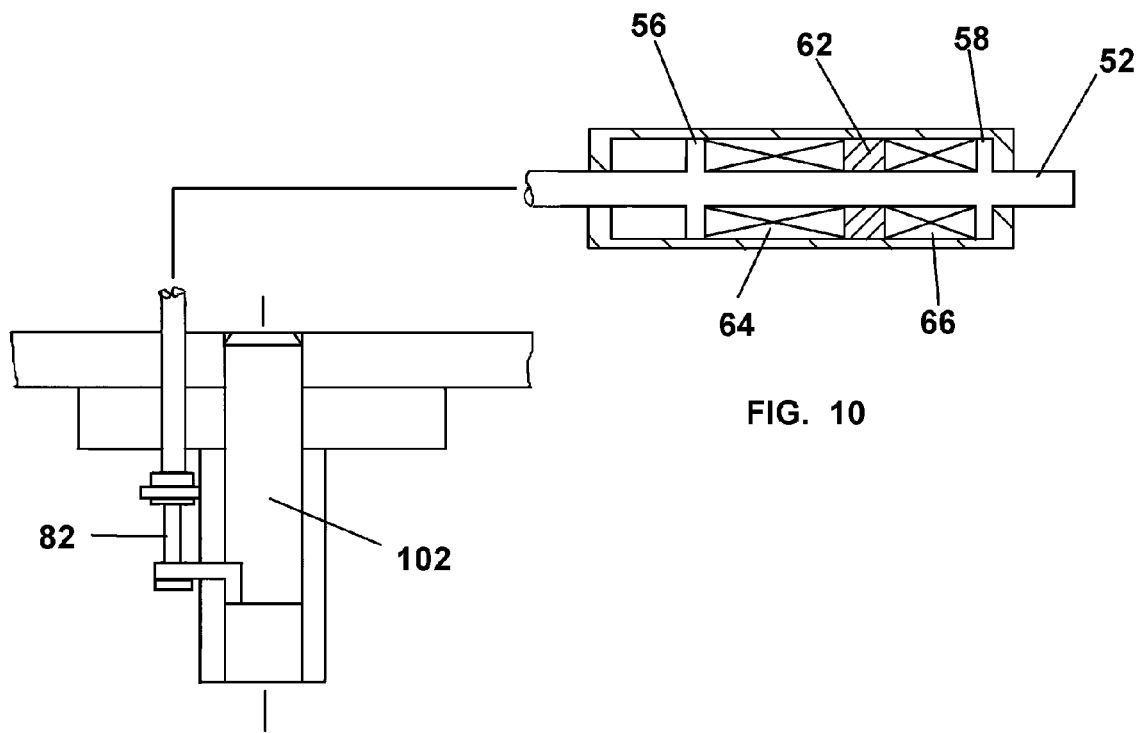
FIG. 10 is a schematic view of the lock assembly in the full bolt insertion position.

FIGS. 9 and 10 illustrate movement to lock the tongue from the preparatory latched condition (FIG. 9) to the completed latched condition (FIG. 10). To establish the preparatory latched condition, the actuator handle 69 is shifted to the right whereby the spring 66 is compressed to establish a retracting bias on the stop collar 58 and the control cable and compressive engagement between the bolt 102 and the lower surface of the nose 90. At this position, preferably the left stop plate 70 is rotated to the position shown in FIG. 6 thereby maintaining the handle position. At this position, the holes 96 and 98 in the arm 92 and nose 90 are circumferentially misaligned. To overcome the misalignment, the towing vehicle is forwardly moved, readily resulting in momentary alignment of the holes allowing the bolt to shift automatically upwardly to the FIG. 8 latched condition. The stop plate may remain in the lock position to prevent any tendency for the lock bolt to shift during transit toward the latched condition.

The present invention thus provides a tongue lock apparatus that can be used on both existing and new trailers to achieve safely the selective latching of the trailer tongue to enable and disable tongue pivoting. The components may also be alternatively located to provide safe actuation and tongue latching.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed:

1. In a trailed vehicle having a tongue pivotally connected to a trailer chassis for steering a front wheel assembly, a lock assembly for selectively locking and unlocking pivotal movement of the tongue comprising: a tongue member operatively connected to the tongue for concurrent pivotal movement therewith; a first aperture in said tongue member; a second aperture on said trailer chassis axially aligned with said first aperture when the tongue is in a straight ahead position relative to the vehicle; a latch assembly supported on said tongue member, said latch assembly including a slidable latch bolt moveable between an unlatched position in said first aperture allowing the pivotal movement of the tongue and a latched position in said first and second apertures preventing the pivotal movement of the tongue; an actuator assembly carried on said trailer; said actuator assembly including a shift member moveable between a first position and a second position; a cable operatively interconnecting said latch bolt and said shift member for moving said latch bolt to said unlatched position when said shift member is in said first position and for moving said latch bolt to said latched position when said shift member is in said second position; a first spring engaging said shift member and effective under biasing to move said shift member to said first position; a second spring engaging said shift member and effective under biasing to move said shift member to said second position; and an actuator member for selectively biasing said springs, said actuator member in a retraction position biasing said first spring whereby said shift member and said cable move said bolt from said unlatched position to said latched position when said apertures are aligned, said actuator member in an extension position biasing said second spring whereby said shift member and said cable move said bolt from said latched position to said unlatched position when said apertures are aligned.

2. The lock assembly as recited in claim 1 including first lock means for selectively maintaining said actuator member in said retraction position.

3. The lock assembly as recited in claim 2 including second lock means for selectively maintaining said actuator member in said extension position.

4. The lock assembly as recited in claim 3 wherein said actuator comprises a housing and said shift member includes a shaft axially supported by said housing, said shaft including first and second enlarged axially spaced stop surfaces, said first spring engaging and biasing said first stop surface and said second spring engaging and biasing said second stop surface, said first stop surface engaging one end of said housing in said unlatched position and said second stop surface engaging another end of said housing in said latched position.

5. The lock assembly as recited in claim 4 including an axial slot formed in said housing, a sleeve slidably supported on said shaft, and a handle extending through said slot and connected with said sleeve, said handle being axially shifted to one axial end of said slot to establish said biasing on said first spring and axially shifted to another axial end of said slot to establish said biasing on said second spring.

6. The lock assembly as recited in claim 5 wherein said first lock means includes a first stop plate manually rotatable to a position engaging said handle to maintain said retraction position, and said second lock means includes a second stop plate manually rotatable to a position engaging said handle to maintain said extension position.

7. The lock assembly as recited in claim 1 wherein said latch assembly comprises a cylindrical housing supported on said tongue member and axially slidably supporting a cylindrical latch bolt.

8. The lock assembly as recited in claim 7 including an axial slot formed in said latch assembly housing, an actuator member attached at one end to said latch bolt and at another end to said cable.

9. The lock assembly as recited in claim 1 wherein the trailer vehicle includes a spare tire assembly including a support post mounted on a platform at the top front and said actuator includes means for attachment to the support post.

10. The lock assembly as recited in claim 9 wherein said means for attached includes a base having a front flange engaging a front surface of the platform and a clamping assembly for engaging the support post.

* * * * *